April 18, 1950 E. M. ROSCHKE 2,504,354
PHASE CONTROLLED MULTIVIBRATOR
Filed Dec. 24, 1947 2 Sheets-Sheet 1
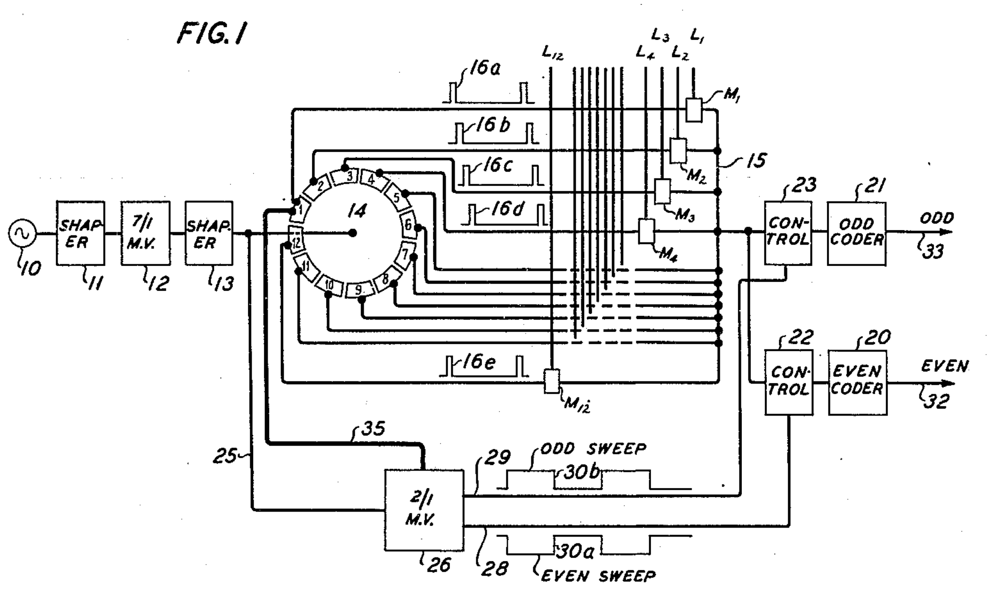
FIG. 3
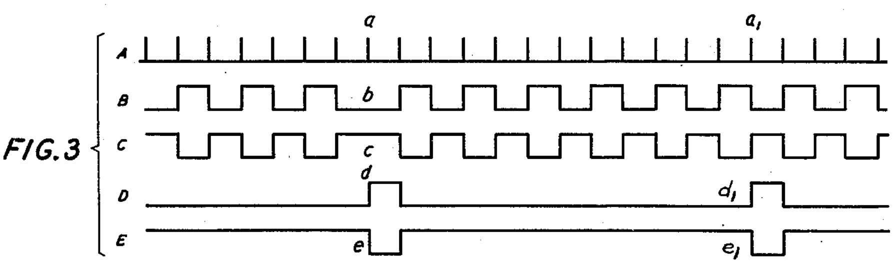
FIG. 4
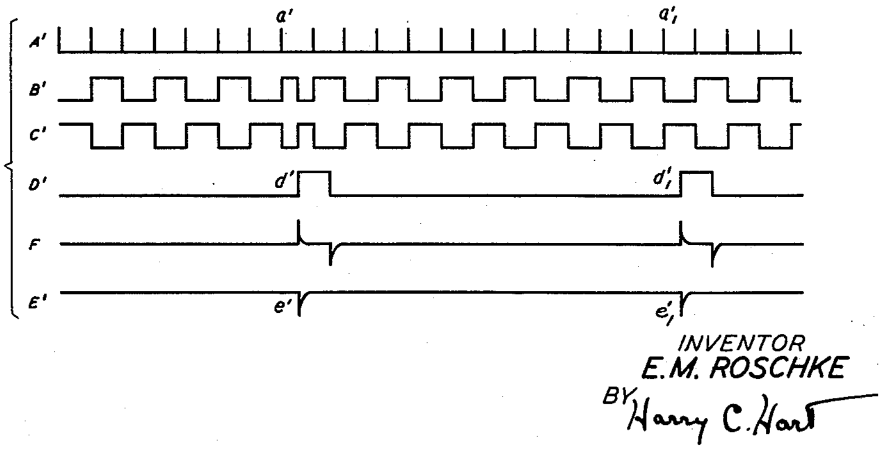
INVENTOR
E. M. ROSCHKE
BY Harry C. Hart
ATTORNEY April 18, 1950 E. M. ROSCHKE 2,504,354

PHASE CONTROLLED MULTIVIBRATOR

Filed Dec. 24, 1947 2 Sheets-Sheet 2

INVENTOR
E. M. ROSCHKE
BY Harry C. Hart
ATTORNEY

Patented Apr. 18, 1950 2,504,354

UNITED STATES PATENT OFFICE 2,504,354

PHASE CONTROLLED MULTIVIBRATOR

Erwin M. Roschke, Maywood, Ill., assignor to Bell Telephone Laboratories, Incorporated, New York, N. Y., a corporation of New York Application December 24, 1947, Serial No. 793,746

10 Claims. (Cl. 250—27)

This invention relates to frequency division systems and has for its principal object the establishment of a preassigned phase relation among the output waves of a plurality of frequency dividers which are actuated by the same source.

In systems requiring the production of waves of a number of different frequencies which must bear an exact relation to each other, it is common to derive all of such waves by a process of frequency division, starting with a frequency equal to or higher than the highest required for use in the system. For this purpose various kinds of trigger action frequency dividers such as multivibrators, flip-flop circuits, chain circuits, ring circuits and the like have proved suitable. The various frequency dividers may be coupled in parallel to a single basic timing source or they may be coupled in tandem for successive division operations, as may be convenient for particular applications.

In certain of these systems it is required that each of the various waves bear not only an exact frequency relation to the others but an exact phase relation as well. A trigger action frequency divider such as a multivibrator does not by itself produce this result. If its frequency division ratio is 3 to 1 or more, the phase of its output wave is ambiguous inasmuch as the particular pulse of a train of frequency control pulses which causes it to trip depends on its past history even though the pulses may be applied to only one of the discharge devices of which it is composed; i. e., even though they be applied asymmetrically. In the particular case of a 2 to 1 step-down multivibrator, the same ambiguity exists when the input frequency control pulses are symmetrically applied to both discharge devices. The ambiguity in this case may be removed by asymmetrical application of the frequency control pulses, but only at the cost of an indefiniteness of timing of the return transitions which are then governed only by the relaxation time of the multivibrator parameters and not positively by a pulse of the basic timing source. In high precision systems, this indefiniteness of return time cannot be tolerated.

Accordingly, a related object of the invention is to remove the ambiguity of phase from the output wave of a trigger action frequency divider.

In accordance with the invention, the stated objects, as well as various subsidiary objects which will subsequently appear, are attained by the provision of a novel coupling between different frequency dividers by which an output pulse from one frequency divider is supplied in asymmetrical fashion to another frequency divider. In a specific example as applied to a 7 digit 12 channel pulse code transmission system, a basic timing source provides the pulses of the code digit frequency. A 7 to 1 step-down multivbrator derives the pulse group frequency from the pulse frequency. A 12 stage ring circuit derives the channel or frame frequency from the pulse group frequency and a 2 to 1 step-down multivibrator comprising two intercoupled discharge tubes derives a routing frequency, namely one half the pulse group frequency, for segregating odd numbered channels from even numbered channels. An incorrect phase relation between the channel frequency and the routing frequency would result in routing messages intended for odd channels into even channels and vice versa. This result is obviated by the coupling of the invention which, in this embodiment, applies an output pulse from one stage of the 12 stage ring circuit in asymmetrical fashion to one tube of the 2 to 1 step-down multivibrator, thus insuring that these two frequency dividers shall remain in step at all times, not only in exact frequency ratio but in correct phase relation as well.

The invention will be fully apprehended from the following detailed description of a preferred embodiment thereof, taken in connection with the appended drawings in which:

Fig. 1 is a schematic diagram, partly in block form, of pulse code transmitter apparatus embodying the invention;

Figs. 3 and 4 are wave form diagrams of assistance in understanding the invention.

Figure 2:
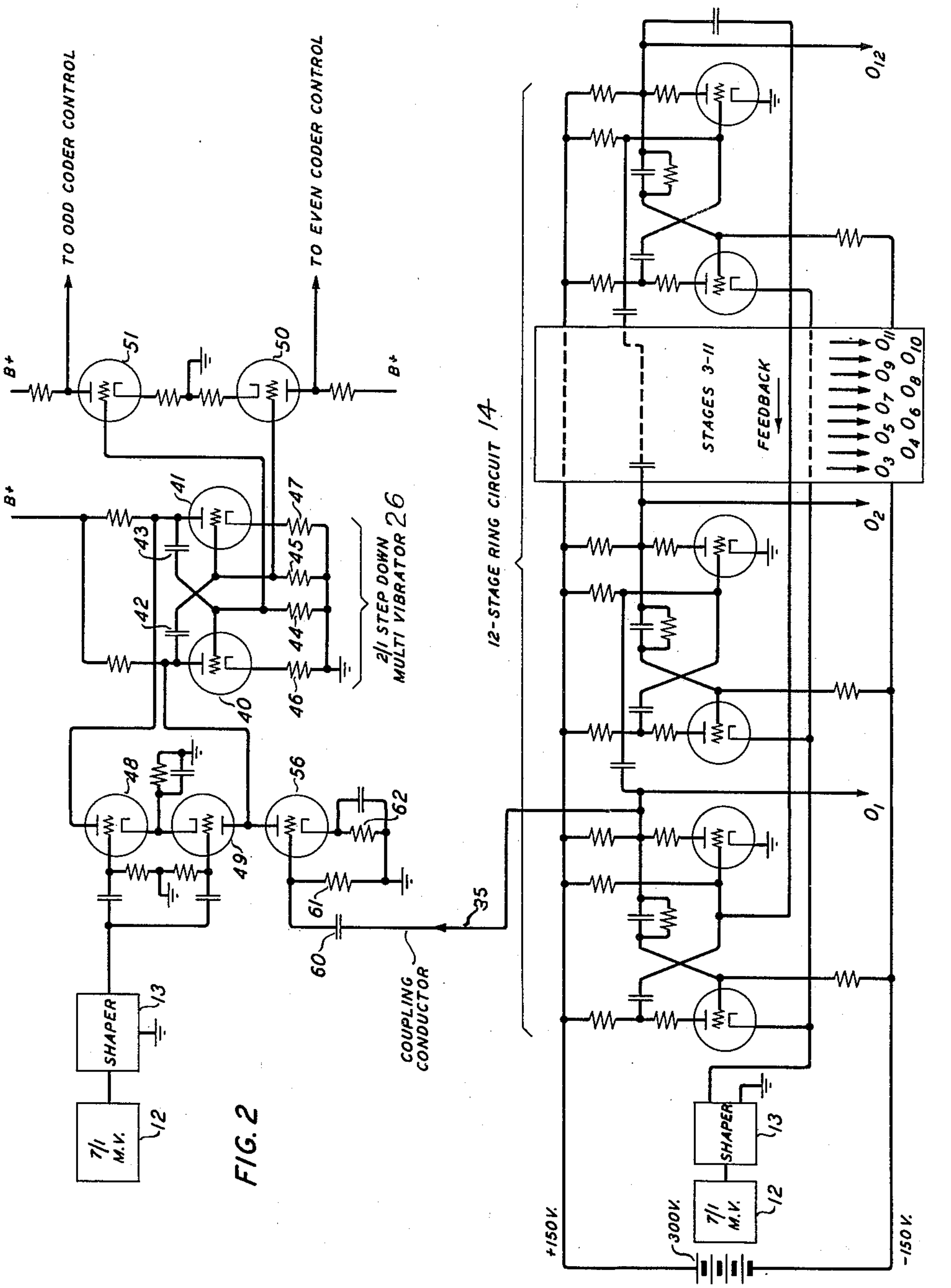
Fig. 2 is a schematic circuit diagram of two frequency dividers, intercoupled in accordance with the invention.

Referring now to the drawings, Fig. 1 shows a basic timing source 10 which may, for example, be a piezoelectrically controlled oscillator delivering a high frequency voltage wave, for example 672 kilocycles per second frequency. This basic timing source is coupled, by way of a shaper circuit 11 which sharpens its output pulses, to a seven-to-one frequency divider which may be a step-down multivibrator 12 of the type disclosed in United States Patent 2,022,969 to L. A. Meacham.

The output of this seven-to-one step-down multivibrator 12 is now applied by way of another shaper 13 which accentuates its voltage transitions to a ring circuit distributor 14 of 12 stages. This distributor, whose details are illustrated in Fig. 2, comprises a set of twelve intercoupled multivibrators, each consisting of a pair of intercoupled discharge tubes, the output of the last stage being coupled back to the first stage. Input control pulses from the shaper 13 are applied to the left-hand cathodes of all stages in parallel. Output pulses $O_1$, $O_2$, etc. are taken from the right-hand anodes of the several stages. As is well known, the conduction condition of such a ring circuit is stepped along the ring stage by stage under control of the input pulses, so that the output pulses recur in regular sequence. For the sake of simplicity, the ring circuit 14 is illustrated in Fig. 1 merely as a group of twelve numbered stages arranged in a circle and controlled in step-by-step fashion by the shaped output pulses of the seven-to-one step-down multivibrator 12.

Each of the output pulses $O_1$, $O_2$, etc. actuates one of a plurality of modulators or samplers $M_1$, $M_2$, etc. to which are coupled twelve incoming lines $L_1$, $L_2$, etc. These lines may be considered as carrying telephone messages which are to be multiplexed and coded. To this end each of the samplers $M_1$, $M_2$, etc. is connected at one side to a common bus 15 and they are actuated in rotation by the output pulses of the 12 stage ring circuit distributor.

The samplers $M_1$, $M_2$, etc. may be pulse-controlled electronic switches of any desired type. Their function is merely to establish a low impedance path between each of the message lines $L_1$, $L_2$, etc. in rotation and the bus 15. This low impedance path is established each time the particular sampler $M_1$, $M_2$, etc. receives a pulse from the particular stage of the ring circuit 14 to which it is connected. The sequential nature of these pulses is indicated by pulse waves 16*a*, 16*b*, 16*c*, etc. on the figure. A preferred type of electronic switch for this purpose is the so-called diode clamp circuit, one form of which is shown and described in the Review of Scientific Instruments for October 1946, page 396.

The signal samples as thus derived are next coded in any desired manner. For example they may be translated into code groups of on or off pulses, i. e., into a binary code. Such a code may have any number of digits dependent on the fidelity of transmission which is required and the transmission band width which is available. Experience has shown that a 7 digit code gives fidelity which is more than sufficient for telephone purposes and accordingly a 7 digit binary code is here selected for purposes of illustration. It is the number of digits in the code, namely, seven, which determines the step-down ratio of the frequency divider 12 whose function is to derive the sampling frequency from the basic pulse frequency.

Because of the high operating speed which is required for the code transmission of telephone messages, it is important that each coder have sufficient time, after performing any coding operation, to restore itself to a suitable initial condition and prepare for the ensuing coding operation. To this end two separate coders 20, 21 are provided, and the successive signal samples appearing on the common bus 15 are applied together to two coder control devices 22, 23 the first of which controls the "even" coder 20 while the second controls the "odd" coder 21.

The individual coders may be of any desired type although a particularly appropriate coder is shown and described in The Bell System Technical Journal for January 1948, pages 1 to 57. It comprises a cathode beam tube having a coding mask in the form of a plate containing a plurality of separate rows of apertures, toward which the beam is directed. The number of "virtual" apertures in each row is equal to the number of digits of the code. The beam is deflected along the mask in proportion to the signal sample amplitude and is then swept across the apertures of a particular row by a sawtooth sweep voltage. The arrangement of the "real" apertures in any particular row is unique, and therefore the particular pulse sequence which results from the passage of the electron beam through the apertures in this row is uniquely related to the particular beam deflection and therefore to the particular message sample amplitude being coded.

The output of the seven to one step-down multivibrator 12, as standardized in form by the shaper 13, is applied by way of a conductor to another frequency divider which may conveniently be a two to one step-down multivibrator 26, the details of which are shown in Fig. 2. This circuit has two output leads 28, 29 on which the voltage wave appears in opposite phase as indicated at 30*a* and 30*b* on the figure. These output pulses, which occur at one half the pulse group frequency output of the seven to one step-down multivibrator 12, are applied respectively to the two coder control devices 22, 23. Each of these control devices may conveniently be a sample-and-hold circuit of well-known variety arranged to establish a low impedance path from the main bus 15 to the coders 20, 21 on the application of positive pulses, and to substantially open this circuit on the application of negative pulses. Thus the pulses 30*b* on the upper output conductor 29 of the two to one step-down multivibrator 26 establish a connection from the bus 15 to the "odd" coder 21 during "odd" pulse group periods while the pulses 30*a* on the lower output conductor 28 of the two to one step-down multivibrator 26 similarly establish a low impedance path from the bus 15 to the "even" coder 20 during "even" pulse group periods. As a result the coders 20, 21 operate in alternation, code pulse groups representing samples of the "even" message channels appearing on the "even" outgoing line 32, and code pulse groups representing samples of the "odd" message channels appearing on the "odd" outgoing line 33, each alternating with the other.

A symmetrically connected multivibrator, arranged as a two-to-one step-down frequency divider, changes suddenly from a first condition in which one tube is conducting and the other is non-conducting, to the opposite condition in which the conduction condition of the two tubes is reversed, upon the application of any signal pulse of an incoming controlling sequence, and changes back again to the first condition on the application of the next pulse of the sequence. However, the condition in which it finds itself just prior to the application of any particular pulse depends on what has happened in the past, and therefore on the character of the transition; that is, whether the first tube shall be rendered conductive or the second tube shall be rendered conductive on the application of any particular pulse is a matter of doubt. If this ambiguity were not somehow removed it might result that "odd" incoming message samples would be routed to the "even" coder and so to the "even" outgoing line. This might cause serious confusion at a receiver station in which the receiving apparatus is arranged to route "odd" incoming code pulse groups to "odd" subscribers and vice versa.

In accordance with the invention this ambiguity is removed by establishing a coupling path from a suitable point of the first frequency divider, namely, the 12 stage ring circuit 14 to the second frequency divider, namely, the two-to-one step-down multivibrator 26. In particular, a single stage of the ring 14 is coupled to the step-down multivibrator 26 by way of a conductor 35. The operation of this circuit will be better understood by reference to Fig. 2 in which the details of a suitable form of two-to-one step-down multivibrator 26, some of the details of the ring circuit 14 and the coupling between them, are shown. Referring now to Fig. 2, the two-to-one step-down multivibrator comprises two triodes 40, 41, the anode of each being coupled by way of a condenser 42, 43 to the control grid of the other. The control grids are returned to ground by way of resistors 44, 45 and the cathodes are returned to ground by way of resistors 46, 47. Input control pulses originating in the seven-to-one step-down multivibrator 12 are applied by way of the shaper 13 to the control grids of two auxiliary triodes 48, 49 whose anodes are directly connected to the anodes of the multivibrator tubes 40, 41 and by way of the coupling condensers 42, 43 to the control grids. The coupling tubes 48, 49 thus serve to pass controlling pulses at substantial amplitude level to the multivibrator control grids together and simultaneously. As is well known, with a circuit of this configuration, application of successive input pulses causes alternation of the conduction distribution among the multivibrator tubes 40, 41 so that the output voltages, which may be conveniently drawn from the control grid resistors 44, 45, alternately rise and fall at a frequency one half the frequency of the input control pulses. These output voltages may now be applied to the control grids of buffer tubes 50, 51 which may be connected in push-pull as shown, their outputs being taken from their anodes and fed to the respective control devices of Fig. 1.

In the lower part of Fig. 2 is shown the ring circuit 14 which comprises a number of similar intercoupled stages in which, when the shaped pulses from the seven-to-one step-down multivibrator 12 are applied to the cathodes of the left-hand tubes of all stages in parallel and simultaneously, the conduction condition moves from stage to stage upon the application of successive pulses. Thus the conduction condition of stage 1, for example, recurs at one-twelfth the frequency of the input pulses. In accordance with this invention, a voltage from one stage of the ring circuit 14 is applied by way of a conductor 55 and a control buffer 56 to a suitable point of one side of the two-to-one step-down multivibrator 26; that is to say it is applied in asymmetrical fashion. A preferred mode of application is at the point at which the anode of either one of the tubes 40, 41 is coupled by way of a condenser 42, 43 to the grid of the other. With minor modifications of the buffer circuit in a manner well known in the art, the application could equally well be made to one of the control grids directly, or to one of the cathodes. When the system is put into operation, pulses originating in the seven-to-one step-down multivibrator 12 are applied in regular sequence by way of the control buffer 56 to both tubes 40, 41 of the two-to-one step-down multivibrator 26 together and in time coincidence. These pulses may be as illustrated in the curve A of Fig. 3. As above explained the two-to-one step-down multivibrator 26 may start in either of two opposite phases. Suppose that it starts in phase indicated by the curves B and C of Fig. 3, wherein the curve B represents the output voltage of the left-hand tube 40 for application to the "odd" coder control device 23 and the curve C represents the output voltage of the right-hand tube 41 for application to the "even" coder control device 22.

Simultaneously with the application of a particular one of these "A" pulses to both tubes, and with every twelfth one thereafter, there is applied a pulse from one stage of the ring circuit 14, by way of the conductor 35, to only one tube 40. The ring circuit anode voltage pulse is represented by "*d*" of curve D, and the pulse applied to the multivibrator 26, inverted in phase by the coupling tube 56, is represented by "*e*" of curve E. The leading edge of this pulse *e* coincides with one of the frequency control pulses *a*. Without the application of this auxiliary pulse *e*, the action of the coincident pulse *a* of the main sequence A would be to drive the left-hand tube 40 from conduction to cut-off, thus raising the potential of its anode, and to render the right-hand tube 41 conductive, thus reducing the potential of its anode. Let it be assumed that this situation passes an "odd" message sample to an "even" coder; i. e., that the phase relation between the two-to-one frequency divider 26 and the twelve-to-one frequency divider 14 is incorrect, resulting in an incorrect routing of message signal samples. Now, however, the auxiliary pulse *e* derived from the ring circuit 14 overpowers the main frequency control pulse *a*, thus causing the two-to-one step-down multivibrator 26 to pause for one-half of its cycle as indicated at *b* and *c* of curves B and C, and then to resume normal operation. At the conclusion of this pause it has changed step; and since it was out of step with the ring circuit before the application of the phasing pulse *e*, it is now in step with the ring circuit and so remains thereafter. After twelve frequency control pulses, a new phasing pulse $e_1$ arrives. Fig. 3 shows the it does not affect the output voltages B and C of the multivibrator.

As a result, a desired preassigned phase relation between the output of the two-to-one step-down multivibrator and of the ring circuit is definitely established at all times except during an initial insignificant interval prior to the application of the first phasing pulse *e*. Thus a correct routing of the code pulse groups representing samples of "odd" messages to the "odd" outgoing line 33, and similarly with respect to the "even" outgoing line 32, is assured.

Due to the presence of miscellaneous delays in various portions of the circuit arrangement, it may be that the leading edge of the phasing pulse *e* does not coincide exactly with the frequency control pulse *a*, but lags it by a substantial fraction of a frequency control pulse period. In this event, its trailing edge would extend past the ensuing frequency control pulse; i. e., the phasing pulse would overlap portions of two frequency control pulse periods. This condition is illustrated in curves A' and D' of Fig. 4 by the phase displacement between the ring circuit anode pulse *d'* and the frequency control pulse *a'*. This would render the operation of the system uncertain. To prevent this result and as a refinement and further feature of the invention, the phasing pulse may be made considerably narrower than the output pulse $d'$ of the ring circuit stage from which it is derived. Any suitable pulse-shortening circuit may be employed, one of the simplest being merely a differentiating circuit, for example the combination of a condenser 60 and a resistor 61 in the coupling conductor 35. With such an arrangement, the leading edge of the ring circuit anode pulse $d'$ generates a short sharp positive pip on the control grid of the coupling tube 56, while its trailing edge produces a short, sharp negative pip at the same point, as illustrated in the curve F. By proper selection of the bias of the coupling tube 56, for example by adjustment of the bias resistor 62, the short, sharp, positive pulse is transferred as an equally short, sharp, negative pulse $e'$ to the anode of the left-hand tube 40 of the multivibrator, while the negative "trailing" edge pulse is of no effect. By this arrangement it may easily be assured that the phasing pulse shall lie well within a single frequency control pulse period rather than overlapping two such periods. The combined effects of the frequency control pulse $a'$ and of the phasing pulse $e'$ on the multivibrator voltage output waves are illustrated in curves B' and C', which are self-explanatory.

At a receiver station, a similar two-to-one frequency divider may be provided for actuating an "odd" decoder and an "even" decoder in alternation, while a similar twelve-to-one frequency divider, for example a ring circuit, may be employed as a distributor to route the decoded signal samples to proper subscribers, and correct phasing between the two frequency dividers may be secured in a manner substantially identical with that hereinabove described.

While described in connection with a pulse communication system as a specific example, the invention is not limited thereto but applies equally to any system in which correct phasing is required between the output voltage of two frequency dividers driven by the same source.

What is claimed is:

1. The combination which comprises a pulse source, a first trigger-action frequency divider having at least two similar input points, connections for applying pulses of said source simultaneously to said input points, whereby the output of said first divider is synchronized with said source but is of undetermined phase, a second frequency divider having a greater number of similar input points, connections for applying pulses of said source to said second frequency divider, whereby the output of said second divider is synchronized with said source but is of undetermined phase, and a coupling from the second frequency divider to one input point of the first divider, whereby a preassigned phase relation is established between the outputs of said two dividers.

2. The combination defined in claim 1 wherein the first trigger-action frequency divider comprises two discharge devices intercoupled as a multivibrator.

3. The combination defined in claim 2 wherein the source pulses are simultaneously applied to the control electrodes of both discharge devices.

4. The combination defined in claim 3 wherein the second frequency divider is a ring circuit.

5. The combination defined in claim 4 wherein output pulses of one stage of the ring circuit are applied to one control electrode of the multivibrator.

6. The combination which comprises a pulse source, a first trigger-action frequency divider of the type in which each half-cycle of its output wave form is externally controllable as to timing, symmetrical connections for applying pulses of said source to control the timing of each of said half-cycles, whereby the output of said first divider is synchronized with said source but is of undetermined phase, a second frequency-divider of greater frequency division ratio, connections for applying pulses of said source to said second divider, whereby the output of said second divider is synchronized with said source but is of undetermined phase, and an asymmetric coupling for applying pulses from the second frequency-divider to the first divider, whereby a preassigned phase relation is established between the outputs of said two dividers.

7. The combination which comprises a pulse source, a first frequency divider actuated by said source, a plurality of message channels, means under control of said first frequency divider for furnishing samples of signals in said message channels in rotation to a common point, a second frequency divider actuated by said source, a plurality of signal paths, means under control of said second frequency divider for establishing connections from said common point to said signal paths in rotation, and a coupling from said first frequency divider to said second frequency divider for establishing a preassigned phase relation between their outputs, whereby a desired systematic distribution of said samples among said paths is assured.

8. The combination which comprises a pulse source, a first multivibrator frequency divider comprising two similar discharge devices, connections for applying pulses of said source simultaneously to both of said devices, a second frequency divider, connections for applying pulses of said source to said second frequency divider, there being a relative phase delay between output pulses of said second divider and pulses of said source such that each output pulse of said second divider overlaps portions of at least two source pulse periods, means for differentiating each output pulse of said second divider to derive a short pulse lying wholly within a single source pulse period, and a coupling means for applying said derived pulses to one of the devices of the first divider, whereby a preassigned phase relation is established between the outputs of said two dividers.

9. The combination which comprises a source of control pulses, a first frequency-divider actuated by said source, a plurality of message channels, means under control of said first frequency divider for furnishing samples of signals in said message channels in rotation to a common point, a second frequency divider actuated by said source, a plurality of signal paths, means under control of said second frequency-divider for establishing connections from said common point to said signal paths in rotation, means for generating phasing pulses indicative of the phase condition of one of said dividers, and means for applying said phasing pulses to the other of said dividers for establishing a preassigned phase relation between the output of said dividers, whereby a desired systematic distribution of said samples among said paths is assured.

10. The combination which comprises a pulse source, a first multivibrator frequency divider comprising at least two similar discharge devices, connections for applying pulses of said source simultaneously to both of said devices, whereby the output of said first divider is synchronized with said source but is of undetermined phase, a plurality of message channels, means under control of said first frequency divider for furnishing samples of signals in said message channels in rotation to a common point, a second multivibrator frequency divider comprising at least two similar discharge devices, connections for applying pulses of said source simultaneously to both of said devices, whereby the output of said second divider is synchronized with said source but is of undetermined phase, a plurality of signal paths, means under control of said second frequency divider for establishing connections from said common point to said signal paths in rotation, means for generating phasing pulses indicative of the phase condition of one of said dividers, and means for applying said phasing pulses to the other of said dividers for establishing a preassigned phase relation between the outputs of said dividers, whereby a desired systematic distribution of said samples among said paths is assured.

ERWIN M. ROSCHKE.

REFERENCES CITED

The following references are of record in the file of this patent:

UNITED STATES PATENTS

| Number | Name | Date |
|---|---|---|
| 2,384,379 | Ingram | Sept. 4, 1945 |
| 2,405,930 | Goldberg et al. | Aug. 13, 1946 |
| 2,406,760 | Goldmark | Sept. 3, 1946 |
| 2,423,466 | Peterson | July 8, 1947 |
| 2,426,454 | Johnson | Aug. 26, 1947 |
| 2,435,207 | Dimond | Feb. 3, 1948 |